June 22, 1937.  B. J. UKROPINA  2,084,466
CONCRETE PIPE JOINT
Filed March 16, 1936
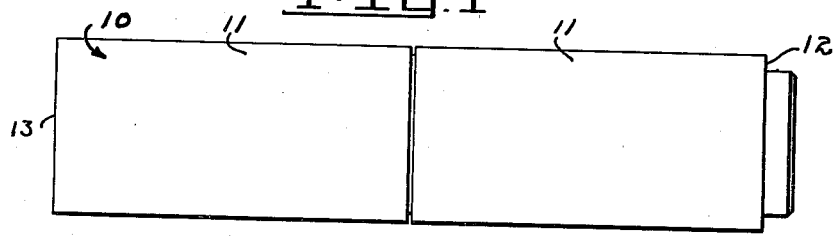
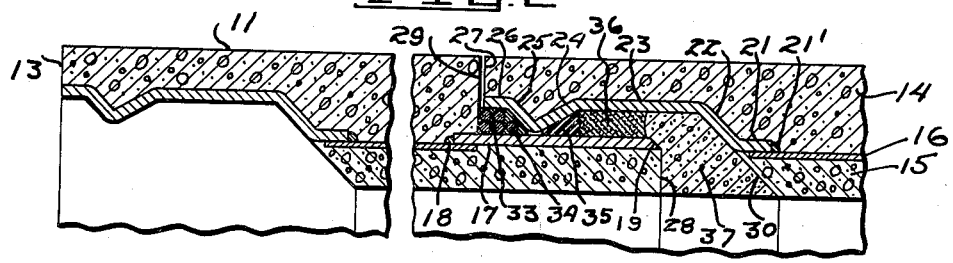
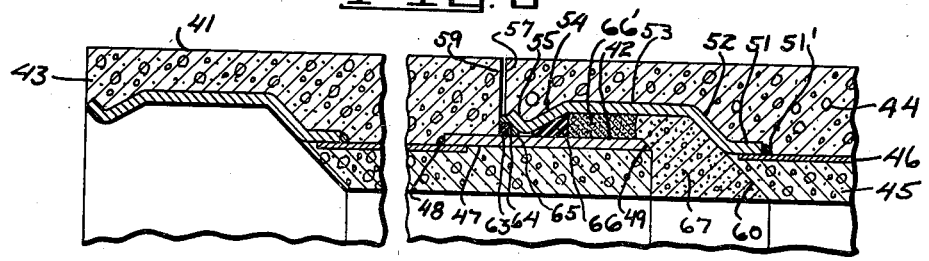
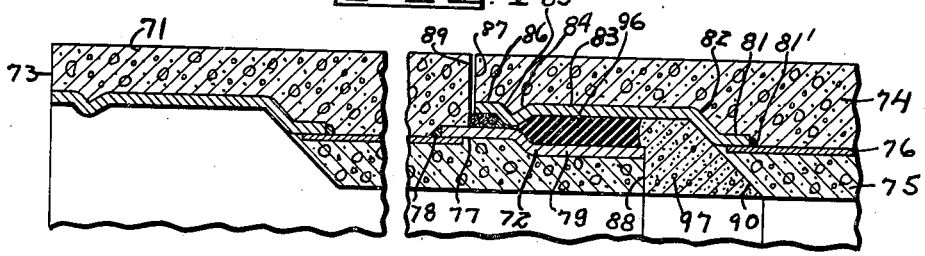
INVENTOR.
B. J. UKROPINA
BY
ATTORNEY.

Patented June 22, 1937

2,084,466

UNITED STATES PATENT OFFICE 2,084,466

CONCRETE PIPE JOINT

Bozidar J. Ukropina, Los Angeles, Calif.

Application March 16, 1936, Serial No. 69,088

2 Claims. (Cl. 285—112)

This invention relates to improvement in concrete pipes.

The general object of the invention is to provide an improved joint for concrete pipes.

Another object of my invention is to provide a concrete pipe joint including pipe lengths having a reenforcement between an inner layer and outer layer of concrete, and wherein novel means is provided for providing a fluid tight joint between the lengths.

Another object of the invention is to provide a concrete pipe joint including novel means for initially sealing a joint prior to the caulking so that the inner surface of the pipe will not be wet during the caulking operation.

Another object of my invention is to provide a concrete pipe joint wherein one of the members at the joint is provided with a pair of reversely facing corrugations to stiffen the member and to provide a caulking space.

An additional object of my invention is to provide a concrete pipe including a corrugation on the bell end which corrugation opens inwardly and wherein there is a bevelled or outwardly flared portion on the pipe beyond the corrugation so that an outwardly formed corrugation is provided.

Other objects and the advantages of the invention will be apparent from the following description taken in connection with the accompanying drawing, wherein:

Fig. 1 is a side elevation showing a concrete pipe embodying the features of my invention;

Fig. 2 is an enlarged, fragmentary, section showing a completed joint between two lengths of pipe;

Fig. 3 is a view similar to Fig. 2 showing a modified form of my invention; and

Fig. 4 is a view similar to Fig. 2 showing a further modification of my invention.

Referring to the drawing by reference characters I have shown a concrete pipe embodying the features of my invention at 10. This pipe comprises a plurality of lengths 11 which are similar and are each provided with a spigot end 12 and a bell end 13.

As shown each length of pipe includes outer and inner layers of concrete 14 and 15 with a tubular, metal, reenforcing, member 16 embedded between the inner and outer layers.

At the spigot end of each length a tubular, metal, spigot, member 17 is secured to the reenforcing member 16 as by welding at 18 although the spigot member may be secured in any desirable manner. The spigot member is preferably cylindrical throughout its entire length and is provided at the outer end with a bevelled portion 19.

The bell end is provided with a metal, bell member which includes a cylindrical portion 21 secured to the reenforcing member 16 by welding as at 21 and an integral outwardly flared portion 22, a cylindrical portion 23 and an inwardly flared portion 24 which terminates in an outwardly bevelled portion 25 to which a cylindrical end portion 26 is secured.

The outer layer of concrete 14 terminates at the bell end as at 27 at a location flush with the end of the cylindrical end portion 26. The inner layer of concrete 15 at the spigot end terminates flush with the end of the spigot member as indicated at 28. The outer layer of concrete at the spigot end terminates at a location spaced from the inner end of the spigot member as indicated at 29, while the inner layer of concrete of the bell end is set back and bevelled as at 30 in line with the outwardly flared portion 22.

The outer diameter of the spigot member is slightly less than the inner diameter of the bell member at the juncture of the outwardly flared portion and the bevelled portion so that the two may be easily assembled with the frusto-conical end face of the outwardly flared portion engaging and sliding along the end of the spigot member. The outer and the inner diameters of the spigot member are substantially the same as the outer and inner diameters, respectively, of the cylindrical portion 22 of the bell member.

Prior to the completion of a joint I preferably place a ring 33 of more or less plastic or compressible material on the inner end of the spigot member. As shown this ring comprises a plurality of strands 34 of a material such as rope about which compressible, deformable material such as asphalt is arranged and when the joint is initially laid by moving one length upon the other this member 33 serves to provide a temporary caulking so that no water will enter, when the pipe is laid in a trench, to interfere with the caulking.

After the parts are assembled as shown in Fig. 2 lead or other caulking material 35 is inserted in the tapering space between the spigot member and the bell member and after this is tamped in place a filling of cement 36 is inserted and then concrete mortar 37 may be placed to complete the joint.

In Fig. 3 I show a modification wherein a plurality of lengths 41 are provided with a spigot end 42 and a bell end 43 embedded between an outer and inner layer of concrete 44 and 45 with a tubular, metal, reenforcing member 46 embedded between the inner and outer layers.

At the spigot end of each length a tubular, metal, spigot member 47 is secured to the reenforcing member 46 as by welding at 48 although the spigot member may be secured in any desirable manner. The spigot member is preferably cylindrical throughout its entire length and is provided at the outer end with a bevelled portion 49.

The bell end is provided with a metal, bell member which includes a cylindrical portion 51 secured to the reenforcing member 46 by welding as at 56' and an integral outwardly flared portion 52, a cylindrical portion 53 and an inwardly flared portion 54 which terminates in an outwardly bevelled portion 55.

The outer layer of concrete 44 terminates at the bell end as at 57 at a location flush with the end of the bevelled portion 55. The inner layer of concrete 45 at the spigot end terminates flush with the end of the spigot member as indicated at 58. The outer layer of concrete at the spigot end terminates at a location spaced from the inner end of the spigot member as indicated at 59, while the inner layer of concrete of the bell end is set back and bevelled as at 50 in line with the outwardly flared portion 53.

The outer diameter of the spigot member is slightly less than the inner diameter of the bell member at the juncture of the outwardly flared portion and the bevelled portion so that the two may be easily assembled with the frusto-conical end face of the outwardly flared portion engaging and sliding along the end of the spigot member. The outer and the inner diameters of the spigot member are substantially the same as the outer and inner diameters, respectively, of the cylindrical portion 52 of the bell member.

Prior to the completion of a joint I preferably place a ring 63 of more or less plastic or compressible material on the inner end of the spigot member. As shown this ring comprises a rope 64 about which compressible, deformable material such as asphalt 65 is arranged and when the joint is initially laid by moving one length upon the other this member 63 serves to provide a temporary caulking so that no water will enter, when the pipe is laid in a trench, to interfere with the caulking.

After the parts are assembled as shown in Fig. 3 lead or other caulking material 66 is inserted in the space between the spigot member and the bell member and after this is tamped in place a filling of cement 66' and mortar 67 is inserted to complete the joint.

In Fig. 4 I have shown a modified concrete pipe which comprises a plurality of lengths 71 which are similar and are each provided with a spigot end 72 and a bell end 73.

As shown each length includes outer and inner layers of concrete 74 and 75 with a tubular, metal, reenforcing member 76 embedded between the layers.

At the spigot end of each length a tubular, metal, spigot, member 77 is secured to the reenforcing member 76 as by welding at 78 although the spigot member may be secured in any desirable manner. The spigot member is preferably cylindrical at its inner end to which a reduced cylindrical outer end 79 is secured.

The bell end is provided with a metal, bell member which includes a cylindrical portion 81 secured to the reenforcing member 76 by welding as at 81' and an integral outwardly flared portion 82, a cylindrical portion 83, and an inwardly flared portion 84 which terminates in an outwardly bevelled portion 85 to which a cylindrical end portion 86 is secured.

The outer layer of concrete 74 terminates at the bell end as at 87 at a location flush with the end of the cylindrical end portion 86. The inner layer of concrete 75 at the spigot end terminates flush with the end of the spigot member as indicated at 88. The outer layer of concrete at the spigot end terminates at a location spaced from the inner end of the spigot member as indicated at 89, while the inner layer of concrete of the bell end is set back and bevelled as at 90 in line with the outwardly flared portion 82.

The outer diameter of the spigot member is slightly less than the inner diameter of the bell member at the juncture of the outwardly flared portion and the bevelled portion so that the two may be easily assembled with the frusto-conical end face of the outwardly flared portion engaging and sliding along the end of the spigot member. The outer and the inner diameters of the spigot member are substantially the same as the outer and inner diameters, respectively, of the cylindrical portion 86 of the bell member.

Prior to the completion of a joint I preferably place a ring 92 of more or less plastic or compressible material on the inner end of the spigot member. As shown this ring comprises a plurality of strands 93 of a material such as rope about which compressible, deformable material such as asphalt is arranged and when the joint is initially laid by moving one length upon the other this member 92 serves to provide a temporary caulking so that no water will enter, when the pipe is laid in a trench, to interfere with the caulking.

After the parts are assembled as shown in Fig. 4 lead or other caulking material 96 is inserted in the space between the spigot member and the bell member and after this is tamped in place a filling of cement 97 is inserted to complete the joint.

From the drawing and description it will be apparent that the bell members, according to the present invention, are provided with an inwardly opening corrugation which forms a stiffening portion and which receives caulking material, and that also an outwardly opening corrugation is provided beyond the caulking corrugation and that the relation of these two corrugations is such that great rigidity and strength is provided in the joint.

From the foregoing description it will be apparent that I have provided a novel pipe joint which can be economically manufactured and installed.

Having thus described my invention I claim:

1. In a concrete pipe, a plurality of lengths, each of said lengths including a reinforcement with a bell member at one end of the reinforcement and a spigot member at the other end of the reinforcement with the bell member and spigot member spaced apart sufficiently to receive packing material; the improvement which consists in providing the bell portion of the reinforcement with an inwardly extending rib acting to separate the packing into two sections.

2. In a concrete pipe, a plurality of lengths, each of said lengths including a reinforcement, a bell member at one end of the reinforcement and a spigot member at the other end of the reinforcement, said spigot member comprising a cylindrical end portion, said bell member comprising an inner cylindrical end portion and an outer cylindrical portion larger than the inner portion, said bell and spigot members being spaced apart to form a chamber, packing material in the chamber and engaging the exterior of the spigot member and the interior of the bell member and also engaging the adjacent end of the length of the pipe material between the bell member and the spigot member, said bell member having an inwardly extending rib acting to separate the packing material and the caulking material.

BOZIDAR J. UKROPINA.